July 7, 1964  R. FOURNIE-TAILLANT-VERNIOULET  3,140,247
GLASS ELECTRODES FOR THE MEASUREMENT OF pH
Filed June 3, 1960  2 Sheets-Sheet 1

July 7, 1964   R. FOURNIE-TAILLANT-VERNIOULET   3,140,247
GLASS ELECTRODES FOR THE MEASUREMENT OF pH
Filed June 3, 1960                                    2 Sheets-Sheet 2

3,140,247
GLASS ELECTRODES FOR THE MEASUREMENT OF pH

Robert Fournie - Taillant - Vernioulet, Villeneuve - Saint-Georges, France, assignor to Commissariat a l'Energie Atomique
Filed June 3, 1960, Ser. No. 33,731
Claims priority, application France June 10, 1959
8 Claims. (Cl. 204—195)

The use of glass electrodes for the measurement of pH is limited particularly by the phenomena of corrosion of the glass by the internal buffer solution, which become appreciable at high temperature; the products of corrosion formed run into this solution, the volume of which is low, so that it can no longer produce its buffer effect.

At ordinary temperature, the pH of the internal buffer solution remains constant; the potential presented by the surface of the glass in contact with the liquid of which it is desired to measure the hydrogen ion concentration varies linearly with the pH; the glass electrode thus acts as a hydrogen electrode.

For a glass of good quality, at a predetermined temperature and if the buffer is stable, the slope of the line representing the potential E as a function of Ph is, at about 4–5%, that of the Nernst equation.

Above a certain temperature, the variations of Ph of the internal aqueous buffer cause instability and non-reproducibility of the potential of the electrode.

Thus, a temperature being chosen, the measurement of the potential of these electrodes, after bringing to the temperature the solution the pH of which is to be measured, gives quite different values after the instant when it is effected; also, during a series of successive heatings and coolings of a given solution, the potentials measured at the same temperature present considerable differences of value.

The use of an aqueous internal buffer thus limits the range of use of glass electrodes, as regards high temperatures, to about 100° C. A known expedient for overcoming the disadvantages of corrosion in glass electrodes consists in dispensing with the aqueous internal buffer and in metalizing, for example by silvering, the interior of the small glass bulb which terminates the glass electrode at its lower part.

This metalization poses technical problems, which have not been resolved in a satisfactory manner; it is in fact difficult to effect a uniform metallic deposit and the differences of the coefficients of thermal expansion of the glass and the deposited metal become considerable above a certain temperature; on the other hand, the production of the joint between the conductive metallic filament and the deposited metal and the electrical insulation are always delicate.

The use of mercury has a considerable interest because of its ready use; however, authors who have attempted its use have obtained hardly reproducible and often incoherent results and the use of mercury has thus been abandoned.

The invention relates to a glass electrode for the measurement of pH which overcomes the disadvantages due to the use of an aqueous internal buffer.

This invention is characterised in that the electrode comprises a metallic junction constituted by an amalgam, for example an amalgam of lead, zinc or tin, contained in the lower part, of glass of low thickness, of the glass electrode, and by a metallic filament insoluble in mercury or the amalgam at high temperatures, for example tungsten, tantalum or molybdenum, the amalgam being covered by a liquid insulating layer.

Glass electrodes according to the present invention have criteria of stability, reversibility and fidelity which render them eminently suitable for the measurement of pH.

The range of temperature within which the electrodes have the above properties corresponds to the usual range of use of glass; measurements carried out show that the potential continues to follow at least approximately the Nernst law, while the electrode resists the effects of temperature, even if the glass undergoes slight corrosion; up to at least 150° C., this law is followed closely, in that the potentials obtained are reproducible up to this temperature; even after prolonged heating at 150° C., the electrodes retain their initial potential on being immersed in a buffer solution in the cold.

The metals used to constitute the metallic filament should be insoluble in the amalgam over the whole range of temperatures of use of the electrodes and are in general metals insoluble in mercury; tungsten, tantalum and molybdenum are particularly suitable; platinum and zirconium, which are attacked from 100°–110° C., are not suitable for use at high temperatures; platinum is suitable to some extent up to 55° C., a considerable increase in its solubility occurring between 55° and 71° C.

Referring to the accompanying diagrammatic FIGS. 1–4, there is described below an embodiment, given by way of example only, of the operation of a glass electrode for the measurement of pH in accordance with the invention. In the drawings.

Figure 1:
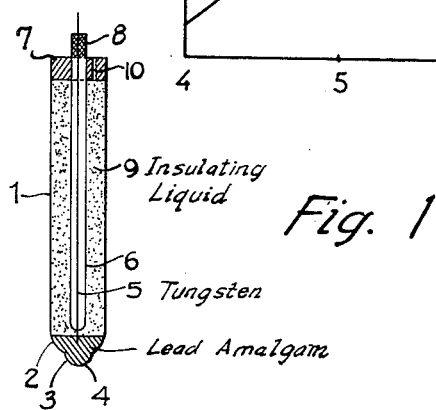
FIG. 1 shows in section a glass electrode according to the invention.

FIG. 1 shows a tube of glass 1, the lower part of which, comprising a convex part 2 and a bulb 3, are of thin wall section; this part contains a lead amalgam 4; the conductive filament 5 is made of tungsten; it is protected by an insulating cover 6 of polytetrafluoroethylene through which it passes at its lower part to penetrate into the amalgam 4; the glass tube 1 is closed by an insulating stopper 7 of polytetrafluoroethylene through which passes the insulating casing 6; the upper part of the latter is provided with an electrical screen 8; a layer 9 of an insulating liquid surrounds the insulating cover 6 and contacts the surface of the amalgam 4; this layer 9 of insulating liquid can have a density lower or higher than that of water; in the first case it can be, for example, a silicone of the methyl type or methyl polysiloxane; in the second case, it can be for example a silicone of the methylphenyl type or methylphenyl polysiloxane. The advantage of using this second type of silicone is that it permits measurements by total immersion of the electrode, without any electrical leakage.

Communication between the interior of the glass electrode and the exterior is effected by means of a channel 10 provided in the stopper 7 and permits harmful forces to be avoided due to pressure on the thin walls of the lowest part of the tube 1.

Figure 2:
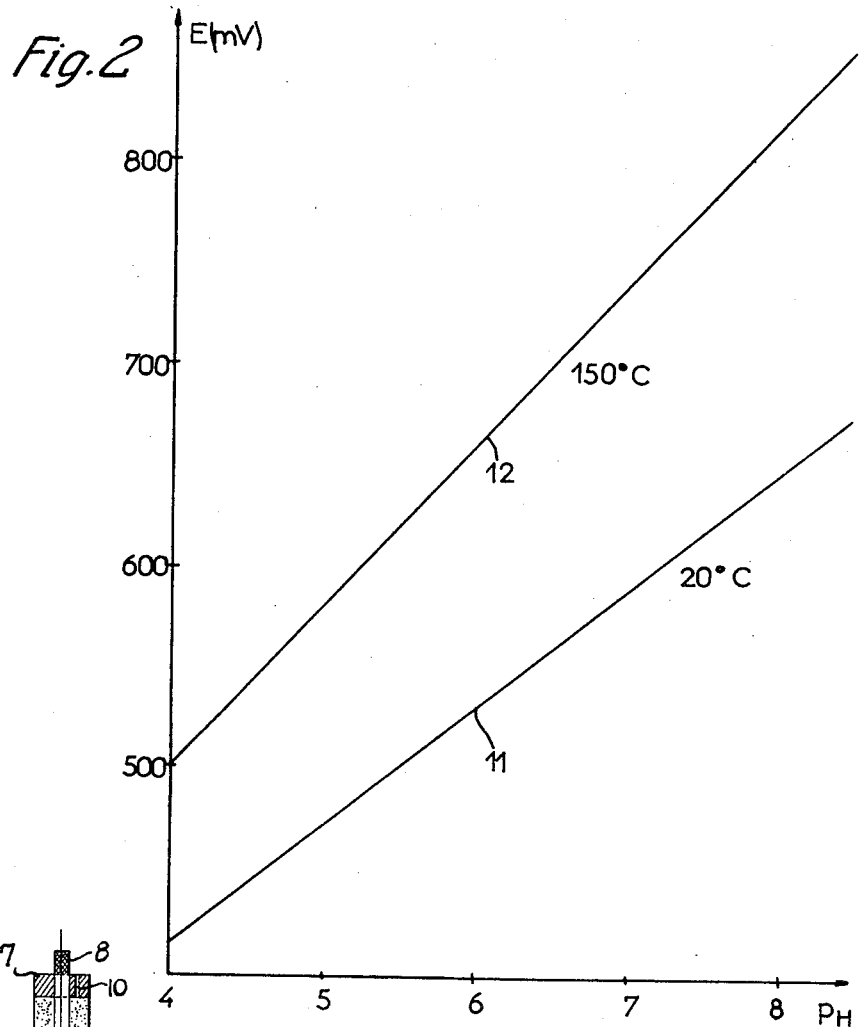
FIG. 2 shows standard curves giving, after stabilization, the potential of this electrode as a function of the pH of the external temperature for two temperatures.

FIG. 2 shows standardised curves 11 and 12 respectively giving the potential of this electrode at 20° C. and 150° C. as a function of the pH of solutions in which the tube 1 is immersed; the potential is expressed in millivolts; as these curves are straight lines between pH 4 and 9, the potential of the electrode varies in accordance with the Nernst law; the slope of the line 11 is 57.5 millivolts per unit of pH and that of the line 12 is 81 millivolts per unit of pH. Above 150° C. and in an excessively alkaline or acid medium, the electrode loses its qualities of stability and reproducibility.

Figure 3:
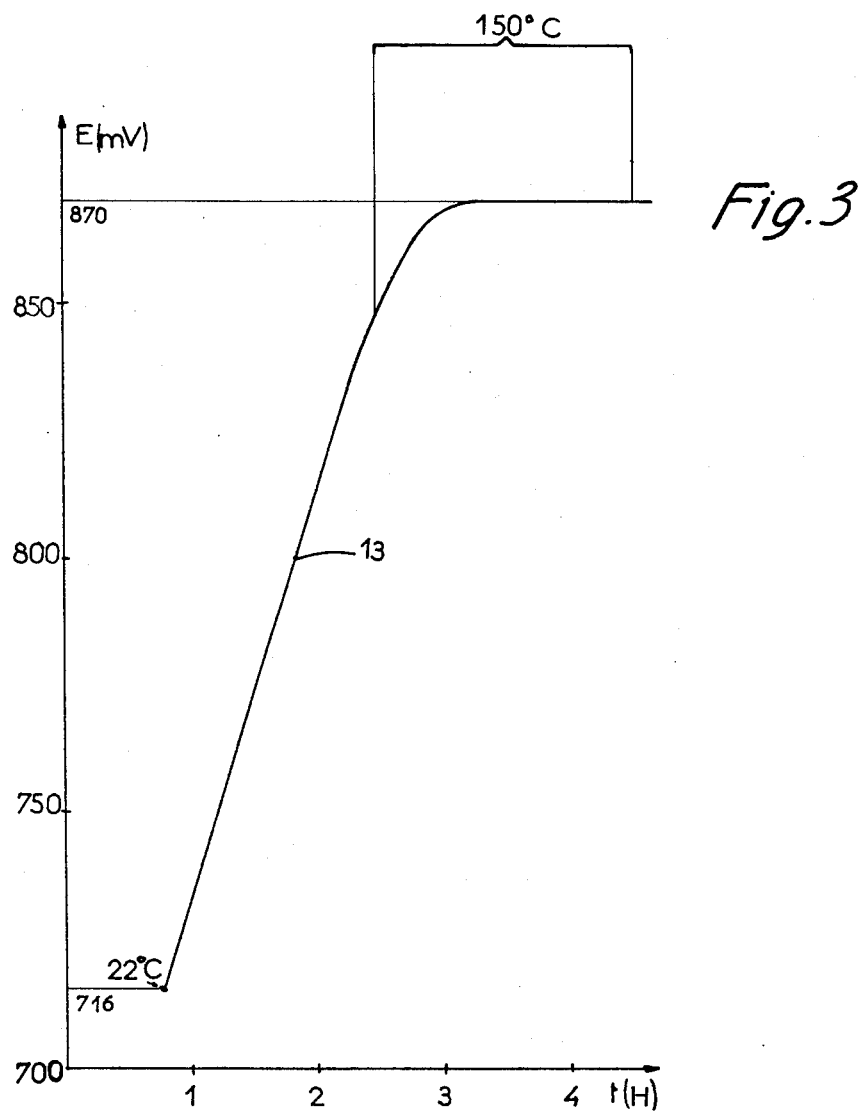
FIG. 3 shows the curve giving, during heating, the potential of the electrode in a given external solution.

FIG. 3 shows the curve 13 giving the potential of the same electrode immersed in a buffer liquid having a pH of 9.20 at 20° C. and 8.6 at 150° C., as a function of the time of heating; the temperatures corresponding to the different zones of this curve are indicated in the figure; about 1 hour after the temperature of the solution has attained the temperature of the region, namely 150° C. in this case, the potential becomes stabilized at 870 millivolts.

Figure 4:
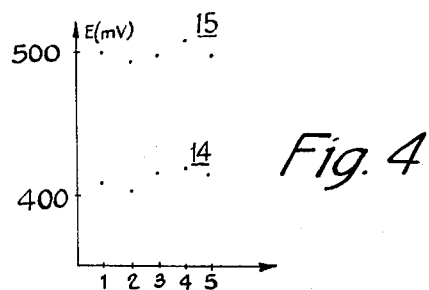
FIG. 4 shows series of points, giving for two temperatures the potential of the same electrode for several tests.

Referring to FIG. 4, two series of points 14 and 15 are shown corresponding respectively to temperatures of 20° C. and 120° C.; the ordinates of these points represent the potential of the above-described electrode immersed in a buffer solution of pH 4; the tests are represented by the abscissae; as each test is separated from the following one by cooling to the ambient temperature of 20° C. or by heating to 120° C., reproducibility in the time of the measured value of the potential can be inferred.

In a general manner, glass electrodes according to the present invention produce all characteristic curves analogous to the curves of FIGS. 2 and 3.

I claim:

1. In a glass electrode for the measurement of pH at temperatures up to 150° C., a hollow glass tube, a thin pH sensitive glass bottom for said tube free of metal coating on its internal surface, an amalgam in said bottom, a metallic filament in said tube forming a metallic junction with and insoluble in said amalgam at high temperature and a liquid insulating layer in said tube covering said amalgam.

2. A glass electrode as described in claim 1, said amalgam being an amalgam of lead.

3. A glass electrode as described in claim 1, said amalgam being an amalgam of zinc.

4. A glass electrode as described in claim 1, said amalgam being an amalgam of tin.

5. A glass electrode as described in claim 1, in which said metallic filament is tungsten.

6. A glass electrode as described in claim 1 in which said metallic filament is tantalum.

7. A glass electrode as described in claim 1 in which said metallic filament is molybdenum.

8. A glass electrode as described in claim 1 in which said liquid insulating layer is a silicone of the methylphenyl type having a density greater than that of water.

References Cited in the file of this patent

UNITED STATES PATENTS

| | | |
|---|---|---|
| 2,117,596 | Bender et al. | May 17, 1938 |
| 2,697,070 | Arthur | Dec. 14, 1954 |
| 2,905,740 | Smyth et al. | Sept. 22, 1959 |

FOREIGN PATENTS

| | | |
|---|---|---|
| 509,555 | Great Britain | July 18, 1939 |

OTHER REFERENCES

Gerke: "Physical Review," vol. 1, January 1925, pp. 377–395.